March 2, 1965  E. STÜRMER ETAL  3,171,429
VALVE WITH SPHERICAL PLUG
Filed March 9, 1962  5 Sheets-Sheet 1

INVENTORS
Erich Stürmer
Heinz Boldt
Ulrich Münch

March 2, 1965  E. STÜRMER ETAL  3,171,429
VALVE WITH SPHERICAL PLUG
Filed March 9, 1962  5 Sheets-Sheet 2
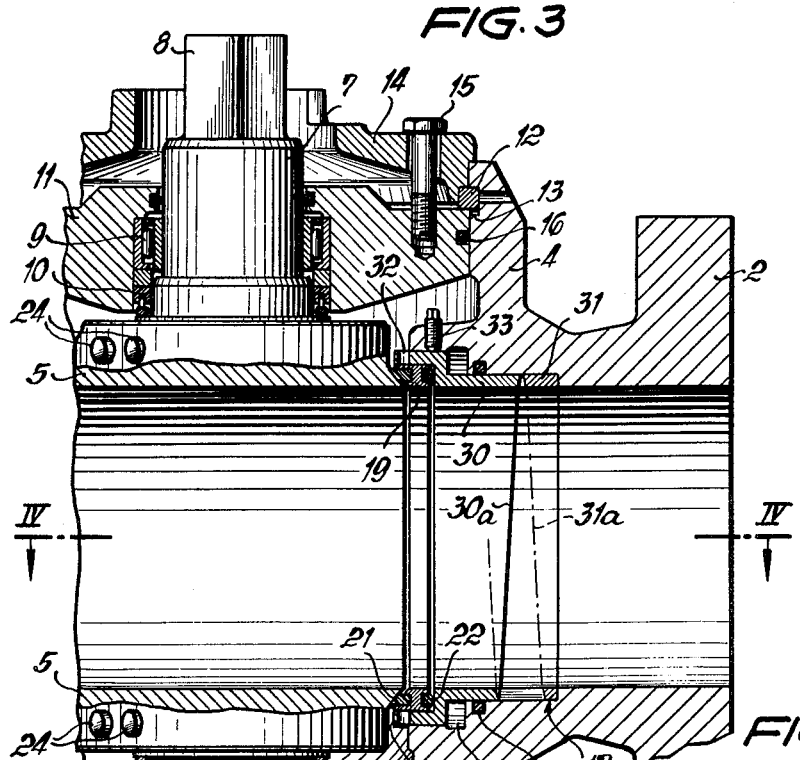
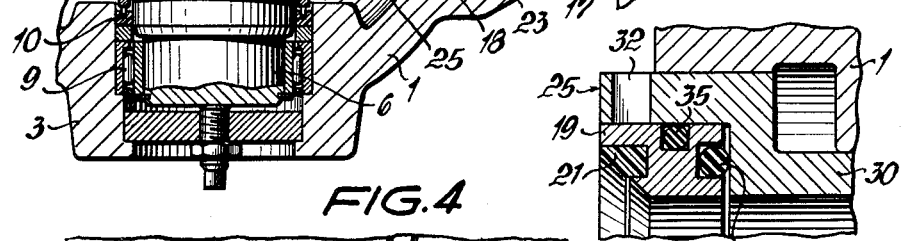
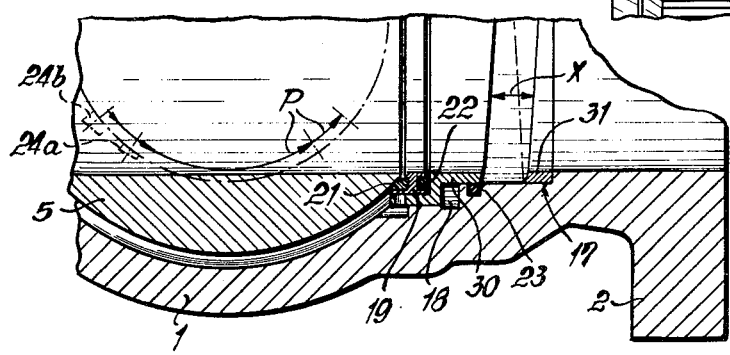
INVENTORS
Erich Stürmer
Heinz Boldt
Ulrich Münch March 2, 1965 E. STÜRMER ETAL 3,171,429
VALVE WITH SPHERICAL PLUG
Filed March 9, 1962 5 Sheets-Sheet 3

INVENTORS
Erich Stürmer
Heinz Boldt
Ulrich Münch

March 2, 1965   E. STÜRMER ETAL   3,171,429
VALVE WITH SPHERICAL PLUG
Filed March 9, 1962   5 Sheets-Sheet 4

INVENTORS
Erich Stürmer
Heinz Boldt
Ulrich Münch
By

March 2, 1965 E. STÜRMER ETAL 3,171,429
VALVE WITH SPHERICAL PLUG
Filed March 9, 1962 5 Sheets-Sheet 5

INVENTORS
Erich Stürmer
Heinz Boldt
Ulrich Münch
By
Walter Becker

United States Patent Office 3,171,429
Patented Mar. 2, 1965

3,171,429
VALVE WITH SPHERICAL PLUG
Erich Stürmer, Berlin-Reinickendorf, Heinz Boldt, Berlin-Charlottenburg, and Ulrich Münch, Berlin-Spandau, Germany, assignors to Borsig Aktiengesellschaft, Berlin-Tegel, Germany, and Werner Hartmann, Ehlershausen uber Lehrte, Germany
Filed Mar. 9, 1962, Ser. No. 179,290
Claims priority, application Germany, Mar. 15, 1961, B 61,689
12 Claims. (Cl. 137—315)

The present invention relates to a valve with spherical stop or plug which, by means of two bearing studs, is journalled in an undivided valve housing while the sealing of the valve passage in the housing with regard to the plug or stop is effected by sealing rings displaceable in the direction of the flow passage, and while the plug or stop is inserted in a cylindrical bore extending in the direction of the axis of the plug or stop.

Valves of the above-mentioned type are employed for shutting off gas and oil lines or other lines conveying liquid media, especially media conveyed under a high pressure, as for instance, in excess of 100 atmospheres above atmospheric pressure.

Valves of the above-mentioned type with undivided housing have the advantage that they have relatively small dimensions. The displaceable arrangement of the sealing rings was heretofore obtained by making the sealing rings displaceable within the valve housing in the direction of the flow passage through the intervention of a screw-thread. However, such threads are expensive to manufacture, particularly when valves of larger dimensions are involved. They are also cumbersome to operate because, for purposes of obtaining a complete stroke, they have to be rotated by two rotations. Moreover, considerable difficulties have been encountered when the sealing rings, after a longer period of operation, have to be screwed outwardly in order to free the plug or stop. This is due to the formation of crustations or rust on the threads whereby the rotary movement is considerably impeded and sometimes may be impossible.

It is, therefore, an object of the present invention to provide a valve with spherical stop or plug which will overcome the above-mentioned drawbacks.

It is another object of this invention to provide a valve of the type set forth above, with spherical plug or stop, which will make it possible to carry out the maximum stroke by a smaller revolution than was heretofore necessary.

These and other objects and advantages of the invention will appear more clearly from the following specification in connection with the accompanying drawing, in which:

FIGURE 3 is a vertical section similar to that of FIGURE 1 through a modified valve according to the present invention.

FIGURE 4 is a horizontal section taken along the line IV—IV of FIGURE 3.

FIGURE 5 illustrates on an enlarged scale a modified partial section within the range of the ring carrying the sealing ring.

Figure 1:
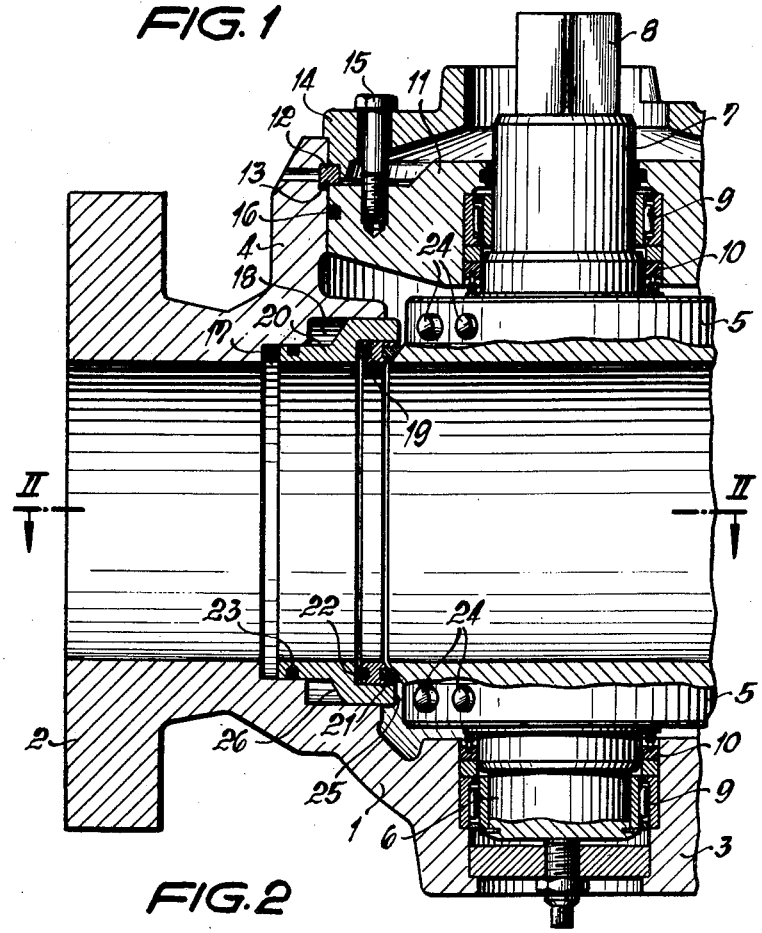
FIGURE 1 illustrates a vertical section through a valve according to the present invention, while, in view of the symmetry between the right-hand and left-hand portions of the valve, the right-hand side is only partially shown.

As has been mentioned above, the present invention concerns a valve with spherical plug or stop which latter, by means of two bearing studs, is journalled in an undivided valve housing while the sealing of the flow passage in the housing relative to the stop or plug is effected by sealing rings displaceable in the direction of the flow passage, and while said plug is inserted in a cylindrical bore provided in the housing and extending in the direction of the axis of the plug. The valve according to the present invention is characterized primarily in that the guiding bushing which displaces the sealing ring in the direction of flow, will in both of its two directions of movement be under the influence of a separate driving member. Of these driving members, that driving member which returns the guiding bushing from its sealing position into the valve housing, is formed by cams mounted on the surface of the plug and adapted in response to a rotation of the plug to act upon the inner marginal portions of the guiding bushing near the end faces of the latter and move the same back. The said cams are preferably arranged in pairs on oppositely located sides of the plug.

According to a particularly advantageous embodiment of the invention, two or more cams with increasing radial height are arranged one behind the other when looking in the direction of rotation of the plug.

The driving member which moves the guiding bushing into sealing position consists, according to the present invention, preferably of an adjusting screw with conical tip which extends through the valve housing, said tip cooperating with a corresponding conical surface of the guiding bushing.

According to another embodiment of the invention, the driving member which moves the guiding bushing into sealing position is, on one hand, formed by the helical annular end faces of the rotatable guiding bushing, and on the other hand, by a ring non-rotatably journalled in the valve housing.

According to a further embodiment of the invention, the driving member which moves the guiding bushing into sealing position is formed on one hand by a pin stationarily journalled in the valve housing, and on the other hand by an annular end face of the rotatable guiding bushing, which end face has been cut off along an incline.

According to a further embodiment of the invention, the driving member which moves the guiding bushing into sealing position consists of a yoke with fork-like prongs having conically pointed ends, said yoke being moved over the guiding bushing over half the circumference and, while resting against an inner housing end face wall of the valve housing, advances a collar of the guiding bushing, by the wall thickness of said yoke, and thus moves the guiding bushing itself into sealing position.

With those embodiments according to which the displacement of the guiding bushings in the flow direction is effected by a rotary movement of the guiding bushings, the guiding bushings are, in conformity with the invention, provided with slots, bores or other uneven formation to allow the employment of a hook-wrench for producing a rotative movement of the guiding bushings.

With all embodiments of the invention, the sealing ring which consists of synthetic material or any other suitable material may be supported by a separate supporting ring mounted in the guiding bushing. The supporting ring mounted in the guiding bushing preferably, in addition to the sealing ring, also comprises a sealing ring in the outer circumferential surface and a resilient sealing ring on the rear end face, of which the last-mentioned sealing ring may be replaced by a non-sealing spring body. When the resilient sealing ring provided on the rear end face of the supporting ring is adapted at the same time to bring about a sufficient sealing, the additional sealing ring on the outer circumferential surface of the supporting ring may be superfluous. As synthetic material for the above purpose may be used polytrifluorochloroethylene.

Figure 2:
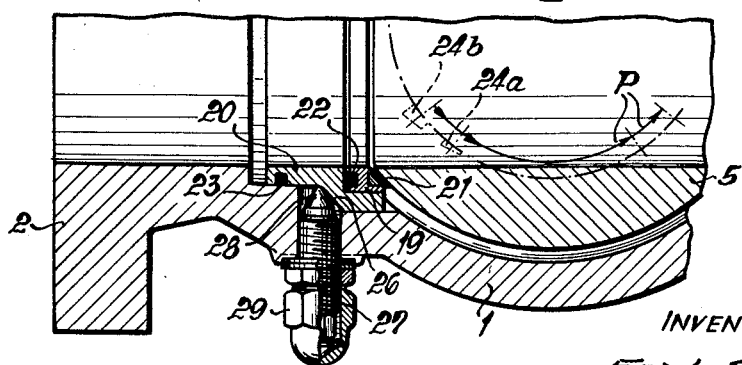
FIGURE 2 illustrates a horizontal section taken along the line II—II of FIGURE 1.

Referring now to the drawing in detail and FIGS. 1 and 2 thereof in particular, the valve illustrated therein comprises a valve housing 1 with a connecting flange 2, a bottom 3 and a neck 4. The spherical plug 5 is provided with bearing studs 6 and 7. The bearing stud 7 is equipped with a square-head 8 for receiving a wrench for actuating the plug. If the valve has rather large dimensions, the square-head 8 may also be connected with an electric motor through a transmission for actuating the plug. The bearing studs 6 and 7 are journalled in anti-friction bearings 9, for instance, needle bearings, having associated therewith corresponding sealings 10, for instance, groove seals or roof seals. In view of the inner high pressure, lid 11 is pressed against a multi-sectional ring 12 mounted in an annular groove 13 of the housing neck 4. The arrangement furthermore comprises a closure plate 14 which is clamped against parts 11 and 12 by means of screw bolts 15. An O-ring 16 is arranged in the peripheral surface of lid 11. Housing 1 is provided with recesses 17 and 18 for receiving a guiding bushing 20 carrying a supporting ring 19. The supporting ring 19 has mounted therein a sealing ring 21 for effecting a seal with regard to the spherical plug 5. The said sealing ring 21 may consist of a synthetic material or any other suitable material. A resilient sealing ring 22 is mounted in ring 19, while an O-ring 23 is mounted in guiding bushing 20.

Provided on the surface of plug 5 are cams 24 which are so arranged that for purposes of establishing uniform sealing pressures between parts 5 and 21, cams 24 are arranged in pairs at both sides of the valve.

As will be evident from FIG. 2, each two cams 24a and 24b are arranged behind each other when looking in the direction of rotation indicated by the arrows P, the cams 24b located in the rear having a greater radial height than the front cams 24a. Consequently, cams 24 cooperate with the inner end faces 25 of the guiding bushing 20 in such a way that with a corresponding rotation of the plug 5, first cams 24a will move back the corresponding guiding bushing 20 to a slight extent, whereupon the then succeeding cams 24b will bring about the final return of the guiding bushing 20. FIGS. 1 and 2 show the guiding bushing 20 located on the left side only. A corresponding guiding bushing is also provided on the non-illustrated right-hand side. Thus, when the plug 5 has rotated once about its axis, it will be evident that by means of cams 24, first one guiding bushing 20 and then the oppositely located other guiding bushing 20 have been pressed outwardly.

The distance by which the guiding bushings have been displaced outwardly in the manner just described will be sufficient to permit the removal of the plug from the valve housing after the members 15, 14, 12 and 11 have been removed.

After plug 5 has again been inserted and parts 11, 12, 14 and 15 have been installed, it is necessary to effect the seal between parts 5 and 21. This is brought about by means of the conical surface 26 on the rear side of the guiding bushing 20 in cooperation with the adjusting screw 27 which is provided with a conical point 28 corresponding to the annular surface 26. A plurality of screws 27 may be distributed over the circular circumference. The screws 27 will be screwed inwardly until the required sealing pressure between parts 5 and 21 has been obtained, which can be ascertained by turning the square-head 8. The screws 27 are provided with a closure cap 29 which simultaneously acts as a seal.

When starting the removal of valve 5, first, screws 27 have to be screwed back in order to permit cams 24 to move back the guiding bushing 20.

A particular advantage of the arrangement shown in FIGS. 1 and 2 consists in that the screws 27 are accessible from the outside and that, if desired, an adjustment of the sealing pressure between parts 5 and 21 will be made possible without the necessity of removing the lid of the valve.

With the embodiment according to FIGS. 3 to 5, the moving back of the guiding bushing 30 is effected by a cooperation of cams 24 with the marginal surfaces 25 at the end face of the guiding bushing 30. The displacement of the guiding bushing 30 and thereby of the sealing ring 21 in the direction toward the plug 5 is effected by a cooperation of the helical end faces 30a of the rotatably journalled guiding bushing 30 with the helical end faces 31a of the non-rotatably mounted ring 31. Ring 31 may be cemented to the recess 17 in the housing or it may be pressed in or secured in any other suitable manner against axial displacement and rotation. The pitch of the helical end faces 30a, 31a advantageously amounts to approximately 5°.

When valve 5 has been installed, prior to the insertion of parts 11, 12, 14 and 15, the guiding bushings 30 are rotated by such an angle that the desired sealing pressure between parts 5 and 21 will be obtained. To this end, the guiding bushing 30 has its marginal portion provided with slits 32 or with bores or the like into which may be inserted a hook-wrench for purposes of turning the guiding bushings. When in this manner the desired sealing pressure has been obtained between parts 21 and 5, lid 11 will be inserted and the closure plate 14 will be mounted. The guiding bushing 30, placed into operational position, will be secured against undesired turning by means of an arresting screw 33.

If it is desired to remove the plug, it is necessary, after loosening and removing parts 15, 14, 12 and 11 and after turning back the arresting screw 33, first to restore the angular starting position of the guiding bushing 30, for instance by means of a hook-wrench, so that there will be obtained the axial distance x between the helical marginal portions 3a, 31a as shown in FIG. 4. It is by this amount that then the guiding bushing 30, by means of cams 24, will be moved back when rotating plug 5 as a result of which plug 5 will be in a position in which it can be removed.

FIG. 5 shows a modification over the arrangement of FIGS. 3 and 4 with regard to the sealing rings inserted in the supporting ring 19. With the embodiment according to FIGS. 3 and 4, it has been assumed that the seals 22 will have a sufficient resiliency in order to assure that also after a certain wear or compression of the sealing ring 21, the required sealing pressure between parts 21 and 5 will, due to the elasticity of sealing ring 22, still be maintained. With the arrangement of FIG. 5, there may also be provided a resilient sealing ring 24. However, when the seal is to be effected by the sealing ring 35, the sealing ring 34 may be replaced by a non-sealing resilient body which has the sole purpose to exert upon the sealing ring 21 the required sealing pressure, if sealing ring 21 should have been deformed or worn to a certain extent.

Figure 6:
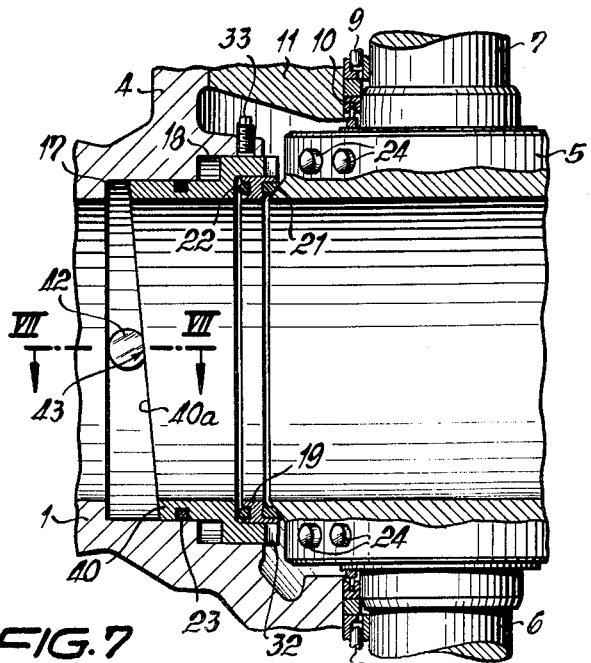
FIGURE 6 represents a vertical section through a still further modification of the present invention.
Figure 7:
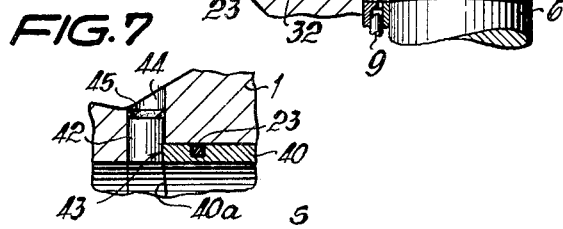
FIGURE 7 is a horizontal section taken along the line VII—VII of FIGURE 6.
Figure 8:
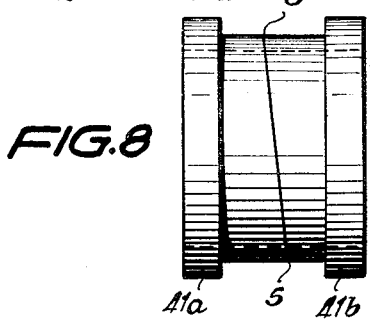
FIGURE 8 illustrates a detail of a valve according to the invention.

With the embodiment according to FIGS. 6 to 8, the end face 40a of guiding bushing 40, which end face has been cut on a slant, cooperates with pin 42 which is provided with an inclined surface 43, which latter is parallel to the surface 40a.

The two guiding bushings 40 required for the supply and discharge side are, according to FIG. 8, obtained by dividing a body of rotation according to the line S—S into two parts 41a and 41b. The line of division S—S will then correspond to the inclined surface 40a according to FIG. 6.

As will be evident from FIG. 7, pin 42 is inserted into a housing bore 44 and at 45° is welded to the wall of the bore.

When the guiding bushing 40 is to be moved in the direction toward the plug, the guiding bushing is by means of a hook-wrench engaging the slits or bores 32, rotated in such a manner that the bushing 40 will, with increasing marginal portion 40a, move upon pin 42. In this way, the guiding bushing is displaced in the direction toward the plug until, again, the required sealing pressure has been obtained between parts 21 and 5.

Prior to the removal of plug 5, it is again necessary to return the guiding bushing 40 by means of the hook-wrench, into its angular starting position whereupon the guiding bushing 40 by means of cams 24 of the rotating plug, is moved back. When the guiding bushing is in its position of operation, the arresting screw 33 will secure the guiding bushing 40 against undesired rotational movement.

Figure 9:
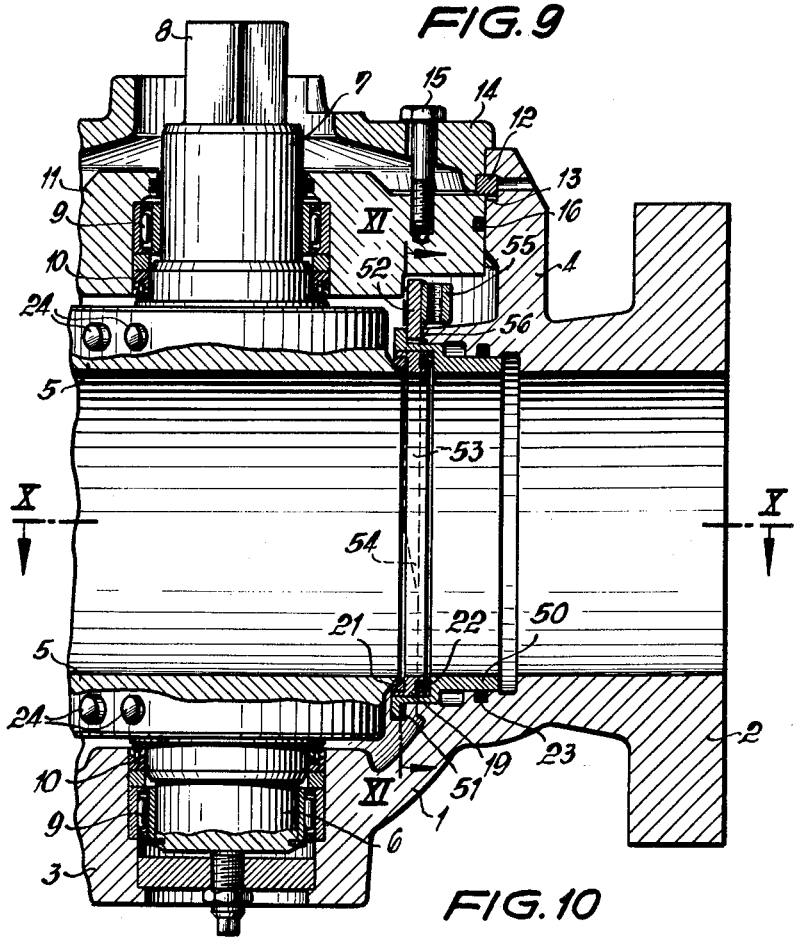
FIGURE 9 is a vertical section through still another modification of a valve according to the present invention.
Figure 10:
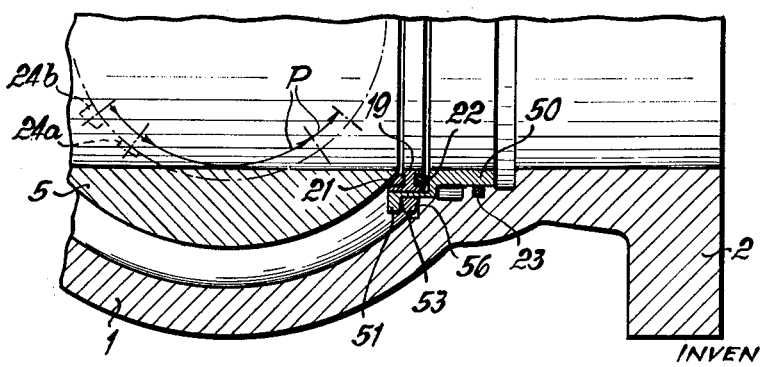
FIGURE 10 represents a section taken along the line X—X of FIGURE 9.
Figure 11:
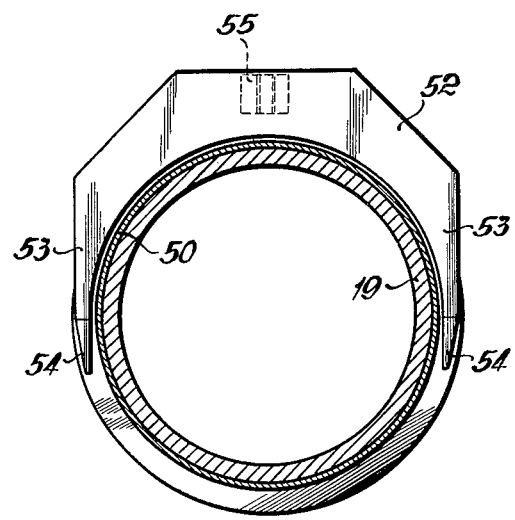
FIGURE 11 is a cross-section taken along the line XI—XI of FIGURE 9.

Also with the embodiments of FIGS. 9 to 11, the return movement of the guiding bushing 40 into the position required for the removal of plug 5 is effected by means of cams 24 provided on the surface of the plug.

After the installation of the plug, the required seal between the latter and the sealing ring 21 on each plug side, is effected by a yoke 24 with fork-like prongs 53 having conically pointed ends 54. When inserting this yoke, its rear wall will rest against the inner housing end face 56, whereas its front wall will move the collar 51 of bushing 50 in front of said front wall until the sealing pressure between parts 5 and 21 has been obtained. The yoke will then embrace the guiding bushing 50 over approximately half its circumference. The wall thickness of yoke 52 is so dimensioned that the desired sealing pressure will be obtained between parts 5 and 21. Slight deviations from the desired sealing presure will be compensated for by the resilient sealing ring 22.

In order to be able, after removal of parts 15, 14, 12 and 11 easily to remove yoke 52, its upper end has been provided with an ear 55.

It is, of course, to be understood that the present invention is, by no means, limited to the particular constructions shown in the drawings, but also comprises any modifications within the scope of the appended claims.

What we claim is:

1. In combination in a valve, a housing having a passage therethrough for conveying a fluid, said housing being provided with a bore having its axis at an angle with regard to the axis of said passage, a rotatable plug extending through said bore and having its ends provided with bearing studs rotatably journalled in said housing, sealing ring means displaceable in axial direction of said passage for sealing engagement with said plug to thereby seal said passage relative to said bore, bushing means axially displaceably mounted within said housing, said bushing means being movable selectively into an effective position to press said sealing ring means against said plug and also being movable into a retracted position to relieve the pressure against said sealing ring means and to permit removal of said plug from said housing while said sealing ring means remain in the housing, first means arranged in said housing for cooperation with said bushing means to move the latter into said effective position, means for making said first means ineffective, and second means arranged on said plug and operable in response to a certain rotation thereof to a position beyond the normal operative limits thereof and while said first means is ineffective to move said bushing means into said retracted position.

2. A valve according to claim 1, in which said second means includes cams provided on the surface of said plug and operable to engage the adjacent end face of said bushing means.

3. A valve according to claim 1, in which said second means includes a plurality of groups of cams arranged on the surface of said plug in such a way that one group of said cams is located diametrically opposite another group of cams.

4. In combination in a valve, a housing having a passage therethrough for conveying a fluid, said housing being provided with a bore having its axis at an angle with regard to the axis of said passage, a rotatable plug extending through said bore and having its ends provided with bearing studs rotatably journalled in said housing, sealing ring means displaceable in axial direction of said passage for sealing engagement with said plug to thereby seal said passage relative to said bore, bushing means axially displaceably mounted within said housing, said bushing means being movable in its axial direction selectively into an effective position to press said sealing ring means against said plug and also being movable into a retracted position to relieve the pressure against said sealing ring means to permit removal of said plug from said housing while said sealing ring means remain in the housing, first means arranged in said housing for cooperation with said bushing means to move the latter into said effective position, means for making said first means ineffective, and a plurality of cams arranged on said plug one behind the other and respectively having successively increasing radial height when looking in a certain direction of rotation of said plug, said cams being operable in response to a rotation of said plug in said certain direction to a position beyond the normal operative limits thereof and while said first means is ineffective to move said bushing means in axial direction thereof away from said plug.

5. In combination in a valve, a housing having a passage therethrough for conveying a fluid, said housing being provided with a bore having its axis at an angle with regard to the axis of said passage, a rotatable plug extending through said bore and having its ends provided with bearing studs rotatably journalled in said housing, sealing ring means displaceable in axial direction of said passage for sealing engagement with said plug to thereby seal said passage relative to said bore, bushing means axially displaceably mounted within said housing, said bushing means being movable in axial direction thereof selectively into an effective position to press said sealing ring means against said plug and also being movable in axial direction thereof into a retracted position to relieve the pressure against said sealing ring means and to permit removal of said plug from said housing while said sealing ring means remain in the housing, said bushing means having a conical surface section with the tip of the conical contour located substantially on the longitudinal axis of said bushing means on that side of said bushing means which is remote from said plug, adjustable screw means extending through said housing and provided with conical surface means adapted selectively to engage said conical surface section of said bushing means to move the latter toward said plug means into said effective position, said screw means also being movable selectively out of engagement with said conical surface section to permit said bushing means to move away from said plug, and means arranged on said plug and operable in response to a certain rotation thereof greater than the normal amount of rotation and while said screw means are retracted to move said bushing means into said retracted position.

6. In combination in a valve, a housing having a passage therethrough for conveying a fluid, said housing being provided with a bore having its axis at an angle with regard to the axis of said passage, a rotatable plug extending through said bore and having its ends provided with bearing studs rotatably journaled in said housing, sealing ring means displaceable in axial direction of said passage for sealing engagement with said plug to thereby seal said passage relative to said bore, rotatable bushing means axially displaceably mounted within said housing, said bushing means being movable selectively into an effective position to press said sealing ring means against said plug and also being movable into a retracted position to relieve the pressure against said sealing ring means and to permit removal of said plug from said housing while said sealing ring means remain in the housing, and ring means stationarily arranged in said housing laterally of said plug and substantially coaxially with the axis of said passage, that end face of said ring means which faces said plug being helically shaped, said bushing means being interposed between said ring means and said plug having that end face which faces said ring means helically shaped in conformity with the helically shaped end face of said ring means for engagement therewith to thereby cause said bushing means in response to a rotation thereof in one direction to move toward said plug into said effective position, said bushing means being rotatable in the opposite direction for establishing clearance between said bushing means and said ring means, and cam means on said plug engageable with the bushing means in response to rotation of the plug beyond one of its normal limits of rotation for moving the bushing means into retracted position.

7. In combination in a valve, a housing having a passage therethrough for conveying a fluid, said housing being provided with a bore having its axis at an angle with regard to the axis of said passage, a rotatable plug with bearing studs rotatably journalled in said housing, with bearing studs rotatably journaled in said housing, sealing ring means displaceable in axial direction of said passage for sealing engagement with said plug to thereby seal said passage relative to said bore, rotatable bushing means axially displaceably mounted within said housing, said bushing means being movable selectively into an effective position to press said sealing ring means against said plug and also being movable into a retracted position to relieve the pressure against said sealing ring means and to permit removal of said plug from said housing while said sealing ring means remain in the housing, and pin means stationarily arranged in said housing and extending through said passage, said bushing means being interposed between said plug and said pin means and having one of its end faces which is remote from said plug helically shaped for sliding engagement with said pin means whereby said bushing means in response to a rotation thereof in one direction is movable toward said plug into said effective position and in response to a rotation in opposite direction is movable away from said plug into said retracted position, and cam means on the plug engageable with the bushing means in response to rotation of the plug beyond one of its normal limits operable for moving the bushing means to retracted position.

8. In combination in a valve, a housing having a passage therethrough for conveying a fluid, said housing being provided with a bore having its axis at an angle with regard to the axis of said passage, a rotatable plug extending through said bore and having its end provided with bearing studs rotatably journalled in said housing, sealing ring means displaceable in axial direction of said passage for sealing engagement with said plug to thereby seal said passage relative to said bore, bushing means axially displaceably mounted within said housing and movable selectively into an effective position to press said sealing ring means against said plug and also being movable into a retracted position to relieve the pressure against said sealing ring means and to permit removal of said plug from said housing while said sealing ring means remain in the housing, the outer peripheral surface of said bushing means being provided with a collar, said housing having a wall section in spaced relationship to said plug, a yoke member provided with fork-like prongs having conically tapering ends and insertable between said wall section and said collar for moving said bushing means into said first position, and cam means arranged on said plug and operable in response to a rotation thereof beyond one of its normal limits and following the removal of said yoke member to move said bushing means into its retracted position.

9. A valve according to claim 1, in which said bushing means is rotatable and is provided with recesses for receiving the hooks of a hook-wrench.

10. A valve according to claim 1, which includes a supporting ring mounted in said bushing means and carrying said sealing ring means.

11. In combination in a valve, a housing having a passage therethrough for conveying a fluid, said housing being provided with a bore having its axis at an angle with regard to the axis of said passage, a rotatable plug extending through said bore and having its ends provided with bearing studs rotatably journalled in said housing, sealing ring means displaceable in axial direction of said passage for sealing engagement with said plug to thereby seal said passage relative to said bore, bushing means axially displaceably mounted within said housing, and being movable selectively into an effective position to press said sealing ring means against said plug and also being movable into a retracted position to relieve the pressure against said sealing ring means and to permit removal of said plug from said housing while said sealing ring means remain in the housing, said bushing means having an annular recess, supporting ring means mounted in said annular recess and carrying said sealing ring means, said supporting ring means having its peripheral surface provided with an annular groove, additional sealing ring means mounted in said annular groove for sealing said supporting ring means relative to said recess of said bushing means, first means arranged in said housing for cooperation with said bushing means to move the latter into said effective position, means for making said first means ineffective, and second means arranged on said plug and operable in response to a certain rotation thereof beyond one of its normal limits and while said first means is ineffective to move said bushing means into said restricted position.

12. A valve according to claim 11, which includes resilient means interposed between that end face of said supporting ring means which is remote from said sealing ring means and the adjacent surface in said recess of said bushing means.

References Cited in the file of this patent

UNITED STATES PATENTS

| | | |
|---|---|---|
| 1,738,450 | Ryan et al. | Dec. 3, 1929 |
| 1,931,797 | Howard | Oct. 24, 1933 |
| 2,639,883 | Smith | May 26, 1953 |
| 2,661,926 | Resek | Dec. 8, 1953 |
| 2,883,146 | Knox | Apr. 21, 1959 |
| 3,037,738 | Jackson et al. | June 5, 1962 |
| 3,038,693 | Dumm | June 12, 1962 |

FOREIGN PATENTS

| | | |
|---|---|---|
| 1,102,510 | Germany | Mar. 16, 1961 |